Patented Nov. 14, 1939

2,179,978

UNITED STATES PATENT OFFICE 2,179,978

PROCESS FOR THE MANUFACTURE OF LEVO-ASCORBIC ACID

Franz Elger, Basel, Switzerland, assignor to Hoffmann-La Roche Inc., Nutley, N. J., a corporation of New Jersey No Drawing. Original application June 6, 1936, Serial No. 84,010. Divided and this application August 29, 1938, Serial No. 227,430. In Switzerland June 18, 1935

3 Claims. (Cl. 260—344)

This application is a division of my co-pending application, Serial Number 84,010, filed June 6, 1936, Patent 2,129,317.

This invention relates to the preparation of levo-ascorbic acid from 2-keto-levo-gulonic acid or its derivatives. It is known that levo-ascorbic acid can be obtained by the action of alkaline reagents on 2-keto-levo-gulonic acid or its esters and subsequent treatment with acids or by warming an acid solution of 2-keto-levo-gulonic acid or such of its derivatives as are readily hydrolysable by acids.

It has now been found that it is particularly advantageous to carry out the transformation of 2-keto-levo-gulonic acid or its esters to ascorbic acid salts with the alkali salts of weak acids in alcoholic solution. The salts which are obtained are then converted into free ascorbic acid by subsequent treatment with an acid reagent.

In this manner levo-ascorbic acid is readily obtained in good yield in a pure state.

The following examples serve to illustrate the invention but the invention is not limited thereto:

Example 1

20.8 parts by weight of 2-keto-levo-gulonic-acid-methyl-ester are dissolved in 300 parts by weight of methyl alcohol and 8.2 parts by weight of finely powdered sodium bicarbonate added. While stirring the mixture thoroughly, it is gradually heated in the water-bath to the boiling point of the methyl alcohol. At about 50° C. the evolution of the carbon dioxide already sets in. After stirring for four hours it is cooled and the sodium salt of ascorbic acid which separates is sucked off. There is a yield of 18.6 parts by weight of sodium ascorbate, which is 94 per cent of the theoretical quantity. The quantities remaining in the mother liquor can be obtained in form of ascorbic acid by extraction of the residue obtained after acidification and evaporation of the mother liquor to dryness in vacuo with absolute alcohol. Alternately, of course, the reaction mixture can be acidified with hydrochloric acid, the methyl alcohol distilled off in vacuo and the ascorbic acid extracted from the mixture of sodium chloride and ascorbic acid with a suitable solvent such as absolute alcohol.

Example 2

104 parts by weight of 2-keto-levo-gulonic-acid-methyl-ester and 45 parts by weight of anhydrous sodium acetate are dissolved in 700 parts by weight of methanol. When the mixture is heated on a water-bath the separation of sodium ascorbate soon begins. After some time the rate of seperation slackens but a yield exceeding 90 per cent can be obtained if the methanol is distilled off, carrying with it some of the acid, adding fresh methanol and continuing the heating. The working up is performed as described in Example 1.

I claim:

1. In a process for the manufacture of levo-ascorbic acid the step comprising heating a compound of the formula

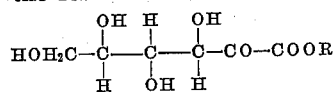

wherein R represents a radical selected from the group consisting of hydrogen and alkyl radicals in the presence of an alkali of a weak acid in substantially anhydrous alcoholic solution.

2. In a process for the manufacture of levo-ascorbic acid the step comprising heating a 2-keto-levo-gulonic ester in the presence of an alkali salt of weak acid in substantially anhydrous alcoholic solution.

3. In a process for the manufacture of levo-ascorbic acid the step comprising heating a 2-keto-levo-gulonic ester in the presence of sodium bicarbonate in substantially anhydrous alcoholic solution.

FRANZ ELGER.